United States Patent
Shimada et al.

(10) Patent No.: US 6,331,498 B1
(45) Date of Patent: Dec. 18, 2001

(54) DIELECTRIC PORCELAIN COMPOSITION FOR ELECTRONIC DEVICES

(75) Inventors: Takeshi Shimada; Kazuhiro Nishikawa, both of Kyoto; Kazuya Toji, Osaka, all of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/581,569

(22) PCT Filed: Dec. 4, 1998

(86) PCT No.: PCT/JP98/05524

§ 371 Date: Jun. 23, 2000

§ 102(e) Date: Jun. 23, 2000

(87) PCT Pub. No.: WO99/33764

PCT Pub. Date: Jul. 8, 1999

(30) Foreign Application Priority Data

Dec. 25, 1997 (JP) .................................. 9-368099

(51) Int. Cl.$^7$ ................................. C04B 35/495
(52) U.S. Cl. ............................................. 501/135
(58) Field of Search ................................ 501/135

(56) References Cited

U.S. PATENT DOCUMENTS 4,752,594 * 6/1988 Hyuga et al. ........................ 501/135
6,117,806 * 9/2000 Yokoi et al. ......................... 501/135

* cited by examiner

Primary Examiner—David Brunsman
(74) Attorney, Agent, or Firm—Dykema Gossett PLLC

(57) ABSTRACT

A dielectric ceramic composition for electronic devices, which exhibits τf and ∈r characteristics equivalent or superior to those of the dielectric ceramic composition of the prior art, can inhibit the evaporation of Zn from the composition to thereby facilitate the control of makeup of the composition, can give homogeneous ceramics through short-time sintering more stably, is improved particularly in permittivity (Qf) and controllability of temperature characteristics, and permits downsizing of the dielectric elements. This composition is a solid solution of $XBa(Zn_{1/3}\cdot Ta_{2/3})O_3$—$Y(Ba_Z\cdot Sr_{1-Z})(Ga_{1/2}\cdot Ta_{1/2})O_3$ which contains a specific trivalent metal ion and has a Zn content adjusted to a predetermined level, wherein part of Ta contained in the $XBa(Zn_{1/3}\cdot Ta_{2/3})O_3$ moiety has been replaced by Nb. The composition is improved not only in permittivity by virtue of the above replacement but also in the degree of sintering by virtue of the above trivalent metal, i.e., Ga contained in the $Y(Ba_Z\cdot Sr_{1-Z})(Ga_{1/2}\cdot Ta_{1/2})O_3$ moiety, thus attaining the effects of improvement in permittivity and control of temperature characteristics simultaneously.

5 Claims, No Drawings

DIELECTRIC PORCELAIN COMPOSITION FOR ELECTRONIC DEVICES

This application is a 371 of PCJ/JP98/05524 filed on Dec. 4, 1998

TECHNICAL FIELD

The present invention relates to a dielectric ceramic composition for electronic devices, that is, to improvements in a dielectric ceramic composition comprising a plurality of perovskite compounds used in the SHF bands, and more particularly to a dielectric ceramic composition for electronic devices, into which specific trivalent metal ions are introduced so as to control the Zn of the composition to a prescribed level, giving a ceramic with more homogenous internal properties and better sinterability, as well as a higher dielectric constant.

BACKGROUND ART

Dielectric ceramic compositions for various electronic devices, which make use of better temperature characteristics with lower loss of the properties of the ceramic composition, include a variety of dielectric ceramic compositions which are used in microwave strip line substrates and dielectric resonators such as for down convertors and satellite communications utilizing the lower loss of properties at the SHF bands, including temperature compensation capacitors.

Complex perovskite compounds of $Ba(B_{1/3}.A_{2/3})O_3$ compositions (A: Ta, and B: divalent metal ions (Zn and/or one or more of Ni, Co, and Mn)) are widely used in particular among conventional perovskite compounds as dielectric ceramic compositions generally employed in SHF bands.

The properties required of $Ba(Zn_{1/3}.Ta_{2/3})O_3$ compositions used in the SHF bands, such as a higher $\in r$, a high Q, and $\tau f=0$, are particularly stringent. The composition must be controlled to be meet such properties, and must therefore be sintered for long periods of times, such as for about 100 hours at 1500° C.

It is important to control the composition, particularly the Zn content, which tends to volatilize, in conventional dielectric ceramic compositions. Zn also diffuses or spreads to the outside of the ceramic during sintering, resulting in Zn-deficient components such as $Ba_5Ta_4O_{15}$, which tend to form what is referred to as "skin," making it difficult to consistently obtain a ceramic with internal homogeneity, as well as to obtain a ceramic with stable properties.

There is a particular need to adjust the resonance frequency temperature coefficient $\tau f$ to a specific level according the application. $Ba(Zn_{1/3}.Ta_{2/3})O_3$ is known to have a $\tau f$ of around 0.

Research on the aforementioned $Ba(Zn_{1/3}.Ta_{2/3})O_3$ composition in order to control the Zn content in dielectric ceramic compositions with complex perovskite compounds has resulted in the proposal of a $Ba(Zn_{1/3}.Ta_{2/3})O_3$—YSr$(Ga_{1/2}. Ta_{1/2})O_3$ solid solution system containing specific trivalent metal ions and an $XBa(Zn_{1/3}.Ta_{2/3})$ $O_3$—Y$(Ba_Z.Sr_{1-Z})(Ga_{1/2}.Ta_{1/2})O_3$ solid solution system (Japanese Laid-Open Patent Application (KOKAI) 2-285616 and Japanese Laid-Open PCT Patent Application (KOHYO) 7-102991).

The recent shifts to smaller electronic devices for communications systems and higher frequency bands in the communications field have resulted in the need for greater dielectric elements because of the lower dielectric constant in conventional dielectric ceramic compositions.

DISCLOSURE OF THE INVENTION

In view of the foregoing circumstances relating to conventional complex perovskite compounds, an object of the present invention is to provide a dielectric ceramic composition for electronic devices which has a $\tau f$ and $\in r$ equal to or greater than that of conventional dielectric ceramic compositions, but in which the volatilization of the Zn content of the ceramic composition is controlled to make it easier to control the composition, to allow a ceramic with internal homogeneity to be consistently be obtained upon sintering for shorter periods of time, to improve the control of the dielectric constant Qf and temperature properties, and to make a smaller dielectric element.

As a result of extensive research to increase the dielectric constant of $XBa(Zn_{1/3}.Ta_{2/3})O_3$—$Y(Ba_Z.Sr_{1-Z})$ $(Ga_{1/2}.Ta_{1/2})O_3$ solid solution systems obtained by introducing specific trivalent metal ions and controlling the Zn content of a composition to a certain level, the inventors perfected the present invention upon finding that substituting a portion of the Ta in the $XBa(Zn_{1/3}.Ta_{2/3})O_3$ moiety with Nb can increase the dielectric constant, that better sintering properties, which are an effect of the content of the aforementioned trivalent metal, specifically, the Ga in the $Y(Ba_Z.Sr_{1-Z})(Ga_{1/2}.Ta_{1/2})O_3$ system, are similarly obtained, and that a higher Qf and better control of the temperature characteristics are also obtained.

As a result of further research on the aforementioned composition to adjust the resonance frequency temperature coefficient $\tau f$, the inventors perfected the present invention upon finding that the resonance frequency temperature coefficient $\tau f$ could be selected as desired by varying the ratio between Ba and Sr in the A site of complex perovskite compounds.

That is, the present invention is a dielectric ceramic composition for electronic devices, comprising a composition having a base composition represented by $XBa\{Zn_{1/3}.(Ta_M.Nb_{1-M})_{2/3}\}O_3$—$Y(Ba_Z.Sr_{1-Z})(Ga_{1/2}.Ta_{1/2})O_3$ where X, Y, Z, and M limiting the compositional range meet the following values: $X+Y=1$; $0.3 \leq X \leq 1$; $0.7 \geq Y > 0$; $0 \leq Z \leq 1$; and $0.2 \leq M \leq 0.8$.

BEST MODE FOR CARRYING OUT THE INVENTION

X and Y of the base composition formula are limited to $0.3 \leq X \leq 1$ and $0.7 \geq Y > 0$ in the present invention because when X is less than 0.3 and Y is greater than 0.7, the resulting dielectric ceramic composition suffers a considerable loss of Qf, and it becomes more difficult to control the resonance frequency temperature coefficient.

Z in the base composition formula in the present invention is within the range of 0 to 1 so as to allow the resonance frequency temperature coefficient $\tau f$ to be selected as desired within the range of +4.0 to -2.0 ppm/° C.

M in the base composition formula in the present invention is limited to the range of $0.2 \leq M \leq 0.8$ so as to allow the dielectric constant to be selected within the range of 29 to 35, and to be compatible according to the size and connections of various filters and electronic devices. A value M of less than 0.2 results in a resonance frequency temperature coefficient deviating considerably from 0, whereas a value greater than 0.8 fails to result in an improved dielectric constant.

In cases where the dielectric ceramic composition of the present invention is such that the Qf at 7 to 8 GHz is 90,000 to 160,000 GHz, $-2.0 \leq \tau f < +4.0$ ppm/° C., and $\in r$ is 29 to 35, the properties will be equal to or greater than those of conventional dielectric ceramic compositions, yet the volatilization of Zn contained in the dielectric ceramic composition can be controlled to a certain extent, even during sintering, to allow the composition to be more easily controlled, Zn segregation in the ceramic to be more easily prevented, a ceramic with better internal homogeneity to be more consistently obtained, and better sintering properties to be obtained, which allow the manufacturing time to be reduced.

In the present invention, virtually the same effects can be obtained when the Zn is substituted by as much as 20 mol % divalent ions such as $Ni^{2+}$, $Co^{2+}$, and $Mn^{2+}$, or alkaline earth ions such as $Ca^{2+}$ and $Mg^{2+}$.

EMBODIMENT

Starting materials were measured out so as to give the compositions shown in Tables 1-1, 2-1, and 3-1. The ingredients were wet mixed in a ball mill, pre-fired for 2 hours at 1200° C., and then milled again to a mean particle diameter of about 1 $\mu$m in the ball mill. The compositions in Table 1-1 ($Ta_{0.6}.Nb_{0.4}$), in Table 2-1 ($Ta_{0.2}.Nb_{0.8}$), and in Table 3-1 ($Ta_{0.8}.Nb_{0.2}$) were used as the base compositions.

The powders were molded by single screw compression molding at 1.0 to 2.0 ton/cm² or by hydrostatic molding at a total pressure of 1 to 5 tons, and then sintered at 1500 to 1550° C., giving sinters with dimensions of 9.8 mm $\phi \times 20$ mm. The resulting sinters were cut to a thickness of 4.5 mm or 9.0 mm. The specific dielectric constant $\in r$ at 25° C. and 9 GHz, the Qf, and the resonance frequency temperature coefficient $\tau f$ (ppm/° C.) were measured. The mean values of the results are given in Tables 1-2, 2-2, and 3-2.

The specific dielectric constant and the Qf in the tables were measured using a dielectric resonator based on the method of Hakki and Celeman. As such, the resonance frequency temperature coefficient $\tau f$, the dielectric constant, and the dielectric constant temperature coefficient $\tau \in$ are related to the magnetic linear thermal expansion coefficient $\alpha$ as shown in the following formula.

$$\tau f = -\tfrac{1}{2}\tau \in - \alpha$$

The results in Tables 1-1 through 3-1 show that the dielectric ceramic compositions according to the present invention are materials that have a broad resonance frequency temperature coefficient from −2.0 to around 4 ppm/° C., little loss of properties, and a high dielectric constant.

TABLE 1-1

| | | Composition $XBa\{Zn_{1/3}.(Ta_{0.6}.Nb_{0.4})_{2/3}\}O_3$- $Y(Ba_z.Sr_{1-z})(Ga_{1/2}.Ta_{1/2})O_3$ | | | Sintering |
|---|---|---|---|---|---|
| | | X | Y | Z | conditions |
| Embodiment | 1 | 0.95 | 0.05 | 0.3 | 1500° C. × 2 Hr |
| | 2 | 0.95 | 0.05 | 0.5 | 1500° C. × 10 Hr |
| | 3 | 0.95 | 0.05 | 1.0 | 1500° C. × 24 Hr |
| | 4 | 0.90 | 0.10 | 0.3 | 1500° C. × 2 Hr |
| | 5 | 0.90 | 0.10 | 0.5 | 1500° C. × 10 Hr |
| | 6 | 0.90 | 0.10 | 1.0 | 1500° C. × 24 Hr |
| | 7 | 0.70 | 0.30 | 0.5 | 1500° C. × 10 Hr |
| | 8 | 0.70 | 0.30 | 1.0 | 1500° C. × 24 Hr |
| Comparison | 9 | 0 | 1 | 0 | 1500° C. × 2 Hr |

TABLE 1-1-continued

| | | Composition $XBa\{Zn_{1/3}.(Ta_{0.6}.Nb_{0.4})_{2/3}\}O_3$- $Y(Ba_z.Sr_{1-z})(Ga_{1/2}.Ta_{1/2})O_3$ | | | Sintering |
|---|---|---|---|---|---|
| | | X | Y | Z | conditions |
| | 10 | 0 | 1 | 1 | 1500° C. × 2 Hr |
| | 11 | 1 | 0 | 0 | 1500° C. × 2 Hr |
| | 12 | 1 | 0 | 1 | 1500° C. × 2 Hr |

TABLE 1-2

| | | Properties | | | |
|---|---|---|---|---|---|
| | | Specific dielectric constant $\in r$ | Qf (GHz) | Temperature coefficient $\tau f$ ppm/° C. | Remarks |
| Embodiment | 1 | 33.4 | 156000 | +2.0 | |
| | 2 | 33.6 | 140000 | +1.8 | |
| | 3 | 33.8 | 106000 | +0.1 | |
| | 4 | 32.8 | 131000 | +1.5 | |
| | 5 | 33.1 | 140000 | +1.2 | |
| | 6 | 33.4 | 145000 | −0.2 | |
| | 7 | 31.9 | 160000 | −0.1 | |
| | 8 | 32.3 | 158000 | −1.3 | |
| Comparison | 9 | 27.3 | 86000 | −45 | |
| | 10 | 26.4 | 42000 | −51 | |
| | 11 | 32.8 | 64000 | +1.0 | Cracks |
| | 12 | 33.1 | 38000 | −2.1 | Cracks |

TABLE 2-1

| | | Composition $XBa\{Zn_{1/3}.Ta_{0.2}.Nb_{0.8})_{2/3}\}O_3$- $Y(Ba_z.Sr_{1-z})(Ga_{1/2}.Ta_{1/2})O_3$ | | | Sintering |
|---|---|---|---|---|---|
| | | X | Y | Z | conditions |
| Embodiment | 1 | 0.95 | 0.05 | 0.3 | 1500° C. × 2 Hr |
| | 2 | 0.95 | 0.05 | 0.5 | 1500° C. × 10 Hr |
| | 3 | 0.95 | 0.05 | 1.0 | 1500° C. × 24 Hr |
| | 4 | 0.90 | 0.10 | 0.3 | 1500° C. × 2 Hr |
| | 5 | 0.90 | 0.10 | 0.5 | 1500° C. × 10 Hr |
| | 6 | 0.90 | 0.10 | 1.0 | 1500° C. × 24 Hr |
| | 7 | 0.70 | 0.30 | 0.5 | 1500° C. × 10 Hr |
| | 8 | 0.70 | 0.30 | 1.0 | 1500° C. × 24 Hr |
| Comparison | 9 | 0 | 1 | 0 | 1500° C. × 2 Hr |
| | 10 | 0 | 1 | 1 | 1500° C. × 2 Hr |
| | 11 | 1 | 0 | 0 | 1500° C. × 2 Hr |
| | 12 | 1 | 0 | 1 | 1500° C. × 2 Hr |

TABLE 2-2

| | | Properties | | | |
|---|---|---|---|---|---|
| | | Specific dielectric constant $\in r$ | Qf (GHz) | Temperature coefficient $\tau f$ ppm/° C. | Remarks |
| Embodiment | 1 | 33.9 | 120000 | +3.8 | |
| | 2 | 34.5 | 105000 | +3.5 | |
| | 3 | 34.9 | 100000 | +1.8 | |
| | 4 | 33.7 | 119000 | +3.3 | |
| | 5 | 34.0 | 109000 | +2.9 | |
| | 6 | 34.2 | 110000 | +0.9 | |
| | 7 | 32.5 | 129000 | +0.9 | |
| | 8 | 33.5 | 126000 | +0.1 | |
| Comparison | 9 | 27.3 | 86000 | −45 | |
| | 10 | 26.4 | 42000 | −51 | |

TABLE 2-2-continued

| | | Properties | | |
| | | Specific dielectric constant $\epsilon r$ | Qf (GHz) | Temperature coefficient τf ppm/° C. | Remarks |
|---|---|---|---|---|---|
| | 11 | 33.6 | 41000 | +3.1 | Cracks |
| | 12 | 83.7 | 39000 | −1.6 | Cracks |

TABLE 3-1

| | | Composition XBa{Zn$_{1/3}$.(Ta$_{0.8}$.Nb$_{0.2}$)$_{2/3}$}O$_3$- Y(Ba$_Z$.Sr$_{1-Z}$)(Ga$_{1/2}$.Ta$_{1/2}$)O$_3$ | | | Sintering conditions |
|---|---|---|---|---|---|
| | | X | Y | Z | |
| Embodiment | 1 | 0.95 | 0.05 | 0.3 | 1500° C. × 2 Hr |
| | 2 | 0.95 | 0.05 | 0.5 | 1500° C. × 10 Hr |
| | 3 | 0.95 | 0.05 | 1.0 | 1500° C. × 24 Hr |
| | 4 | 0.90 | 0.10 | 0.3 | 1500° C. × 2 Hr |
| | 5 | 0.90 | 0.10 | 0.5 | 1500° C. × 10 Hr |
| | 6 | 0.90 | 0.10 | 1.0 | 1500° C. × 24 Hr |
| | 7 | 0.70 | 0.30 | 0.5 | 1500° C. × 10 Hr |
| | 8 | 0.70 | 0.30 | 1.0 | 1500° C. × 24 Hr |
| Comparison | 9 | 0 | 1 | 0 | 1500° C. × 2 Hr |
| | 10 | 0 | 1 | 1 | 1500° C. × 2 Hr |
| | 11 | 1 | 0 | 0 | 1500° C. × 2 Hr |
| | 12 | 1 | 0 | 1 | 1500° C. × 2 Hr |

TABLE 3-2

| | | Properties | | | |
| | | Specific dielectric constant $\epsilon r$ | Qf (GHz) | Temperature coefficient τf ppm/° C. | Remarks |
|---|---|---|---|---|---|
| Embodiment | 1 | 32.4 | 160000 | +1.5 | |
| | 2 | 32.7 | 158000 | +1.4 | |
| | 3 | 32.7 | 159000 | +0.5 | |
| | 4 | 31.5 | 141000 | +1.0 | |
| | 5 | 31.9 | 136000 | +1.1 | |
| | 6 | 32.3 | 135000 | −0.5 | |
| | 7 | 29.3 | 181000 | −0.5 | |
| | 8 | 29.6 | 162000 | −1.6 | |
| Coparison | 9 | 27.3 | 86000 | −45 | |
| | 10 | 26.4 | 42000 | −51 | |
| | 11 | 31.8 | 140000 | −0.8 | Cracks |
| | 12 | 32.0 | 131000 | −3.9 | Cracks |

INDUSTRIAL APPLICABILITY

In the dielectric ceramic composition for electronic devices in the present invention, a portion of the Ta in the XBa(Zn$_{1/3}$.Ta$_{2/3}$)O$_3$ moiety of a XBa(Zn$_{1/3}$.Ta$_{2/3}$)O$_3$—Y(Ba$_Z$.Sr$_{1-Z}$)(Ga$_{1/2}$.Ta$_{1/2}$)O$_3$ solid solution system is substituted with Nb, whereby the Qf at 7 to 8 GHz is between 90,000 and 160,000 GHz, the resonance frequency temperature coefficient ranges widely from −2.0 to around +4 ppm/° C., and the ∈r is 29 to 35. This results in properties equal to or greater than those of conventional dielectric ceramic compositions. Because the volatilization of the Zn in the ceramic composition is controlled to a certain extent, the composition is easier to control, Zn segregation in the ceramic is easier to prevent, a ceramic with internal homogeneity is more consistently obtained, better sintering properties, which are an effect of the Ga in the Y(Ba$_Z$.Sr$_{1-Z}$)(Ga$_{1/2}$.Ta$_{1/2}$)O$_3$ system, are also obtained, allowing the manufacturing time to be reduced, and in particular a higher Qf and better control of the temperature characteristics are also obtained. The material thus has lower loss and a higher dielectric constant.

What is claimed is:

1. A dielectric ceramic composition for electronic devices, comprising a composition having a base composition represented by $$XBa\{Zn_{1/3}.(Ta_M.Nb_{1-M})_{2/3}\}O_3—Y(Ba_Z.Sr_{1-Z})(Ga_{1/2}.Ta_{1/2})O_3$$

where X, Y, Z, and M limiting the compositional range meet the following values:

X+Y=1; 0.3≦X<1; 0.7≧Y>0; 0≦Z ≦1; and 0.2≦M≦0.8.

2. A dielectric ceramic composition for electronic devices according to claim 1, wherein Qf at 7 to 8 GHz is 90,000 to 160,000 GHz.

3. A dielectric ceramic composition for electronic devices according to claim 1, wherein −2.0≦τf<+4.0 ppm/° C.

4. A dielectric ceramic composition for electronic devices according to claim 1, wherein the ∈r is 29 to 35.

5. A dielectric ceramic composition for electronic devices according to claim 1, wherein the Zn is substituted by as much as 20 mol % divalent metal ion or alkaline earth ion.

* * * * *